US 6,254,165 B1

(12) United States Patent
Neubrand (10) Patent No.: US 6,254,165 B1
(45) Date of Patent: Jul. 3, 2001

(54) TONNEAU COVER AND DECKLID LINKAGE AND DRIVE SYSTEM

(75) Inventor: Frank G. Neubrand, Bloomfield, MI (US)

(73) Assignee: CTS Fahrzeug Dachsysteme GmbH, Rochester Hills, MI (US)

( * ) Notice: Subject to any disclaimer, the term of this patent is extended or adjusted under 35 U.S.C. 154(b) by 0 days.

(21) Appl. No.: 09/639,958

(22) Filed: Aug. 16, 2000

(51) Int. Cl.$^7$ ................................................ B62D 25/10
(52) U.S. Cl. ..................... 296/76; 296/136; 296/107.08
(58) Field of Search .................... 296/136, 76, 107.08

(56) References Cited

U.S. PATENT DOCUMENTS

| | | |
|---|---|---|
| 4,799,729 | 1/1989 | Muscat . |
| 5,035,461 * | 7/1991 | Zweigart ........................ 296/107.08 |
| 5,064,241 | 11/1991 | Ohrle . |
| 5,067,768 * | 11/1991 | Fischbach ...................... 296/107.08 |
| 5,100,195 | 3/1992 | Patel . |
| 5,209,544 * | 5/1993 | Benedetto et al. .................... 296/136 |
| 5,219,200 * | 6/1993 | Orth et al. ....................... 296/107.08 |
| 5,295,722 * | 3/1994 | Bonne et al. .................... 296/107.08 |
| 5,322,337 | 6/1994 | Rawlings et al. . |
| 5,533,777 * | 7/1996 | Kleemann et al. .................. 296/136 |
| 5,551,743 * | 9/1996 | Klein et al. ........................... 296/136 |
| 5,558,388 | 9/1996 | Furst et al. . |
| 5,593,202 | 1/1997 | Corder et al. . |
| 5,620,226 * | 4/1997 | Sautter ............................ 296/107.08 |
| 5,654,615 * | 8/1997 | Brodsky ................................ 296/136 |
| 5,769,483 * | 6/1998 | Danzl et al. ..................... 296/107.08 |
| 5,775,766 | 7/1998 | Schaible et al. . |
| 5,823,606 * | 10/1998 | Schenk et al. ........................ 296/136 |
| 5,864,214 * | 1/1999 | Brodsky ................................ 296/136 |
| 5,967,593 * | 10/1999 | Schuler et al. ........................ 296/136 |
| 6,039,382 | 3/2000 | Mather et al. . |

* cited by examiner

Primary Examiner—Joseph D. Pape
Assistant Examiner—Kiran B. Patel
(74) Attorney, Agent, or Firm—Brooks & Kushamn P.C.

(57) ABSTRACT

A tonneau cover connected by a power driven linkage to the decklid of a vehicle is disclosed. The tonneau cover is movable from an extended position covering a storage well for a convertible top or retractable hardtop of a vehicle to a tonneau stowed position wherein the tonneau cover is suspended below the decklid of the vehicle. The linkage system includes right and left side linkages each of which include a four bar link made up of the tonneau cover, a cylinder mounting bracket, a front control link and a rear control link. The linkage is driven by a hydraulic cylinder through an arc of approximately 180°. The hydraulic cylinder is movably mounted on a cylinder rod that is mounted to the decklid.

18 Claims, 5 Drawing Sheets

TONNEAU COVER AND DECKLID LINKAGE AND DRIVE SYSTEM

TECHNICAL FIELD

The present invention relates to a linkage and drive system for a tonneau cover connecting the tonneau cover to the decklid for storage and deployment.

BACKGROUND ART

Tonneau covers are used to cover a storage well for a retractable roof. Tonneau covers are provided for aesthetic purposes and to improve aerodynamics.

One problem with manual tonneau covers is that they must be manually attached over the storage well for the retractable top. Manual tonneau covers take time to install, as a result, and many owners do not install the tonneau cover which adversely impacts aesthetics and aerodynamics of a vehicle.

Power tonneau systems are known that are either incorporated as part of the top stack or are secured to the retractable top storage well. In these types of systems, the tonneau cover pivots vertically upwardly to provide clearance for raising and lowering of the convertible top or retractable hardtop. This approach may require a complex linkage and careful coordination with the top stack operating mechanism. Including the tonneau as part of the top stack or as part of the storage well creates problems relating to storing the tonneau cover when it is not covering the storage well.

Another problem with prior art tonneau covers relates to restraining the tonneau cover when the tonneau cover is in its storage position, not covering the convertible top storage well. If the tonneau cover is not locked in place, it may vibrate and cause unwanted noise.

These and other problems are addressed by applicant's invention as summarized below.

DISCLOSURE OF INVENTION

In accordance with the present invention, a tonneau cover and decklid in combination are provided for a vehicle having a retractable roof. The retractable roof may be either a convertible roof or a retractable hardtop. The tonneau cover is connected to the decklid by a linkage that is movable between a first position wherein the tonneau cover is disposed in front of the decklid and over a roof storage compartment, or storage well, and a second position wherein the tonneau cover is disposed below the decklid. A drive system is operatively connected to the linkage to move the linkage between the first and second positions.

According to another aspect of the present invention, a four bar link is provided as the linkage mechanism. The four bar link includes a front control link connecting a bracket on the front of the tonneau cover to a forward location on a bracket on the decklid and a rear control link connecting the rear of the tonneau cover to a rearward location on the bracket on the decklid. The linkage also includes an idler link that is connected to a bracket secured to the decklid and the rear control link or front control link.

According to another aspect of the invention relating to the drive system, the drive system includes a hydraulic cylinder mounted for movement on the bracket on the decklid. The hydraulic cylinder is mounted on a rod that is secured with a sliding mount to the bracket on the decklid. The hydraulic cylinder is connected through a bracket to the front control link that is connected to the bracket on the front of the tonneau cover. The cylinder is also connected through the bracket to the rear control link that is connected to the rear portion of the bracket on the tonneau cover.

According to the invention, two linkages are provided at transversely spaced locations on brackets connected to the decklid and the tonneau. Two drive systems are provided with one drive system being provided for each linkage.

Another aspect of the invention relates to providing a latch mechanism for a hydraulic cylinder drive that uses a single cylinder and is automatically lockable in two positions. The latch mechanism locks the tonneau in place when covering the storage well for the retractable hood top or convertible in its first position or when stored below the decklid in its second position. The latch mechanism includes a first latch and a catch on the linkage that are coupled together when the tonneau cover is in its first position covering the storage well. A second latch is formed on the decklid to engage a pin (or catch) on the linkage. The second latch and pin are coupled together when the tonneau cover is in the second position, that is, when the tonneau is suspended below the decklid.

The invention also relates to providing a tonneau cover assembly for a vehicle having a retractable roof and a roof storage well. The storage well is disposed behind the rearmost seats of the vehicle. The vehicle includes a decklid and tonneau cover assembly. The tonneau cover assembly includes a tonneau cover panel, a linkage system and a drive system. The linkage system connects the tonneau cover to the decklid. The linkage system has a right side linkage and a left side linkage. Each of the side linkages have a front control link and a rear control link. Each of the front and rear control links has an intermediate pivoting end and an arcuately moving end. The arcuately moving end is connected by a bracket to the tonneau panel. The drive system is operatively connected between the linkage system on a bracket on and the decklid to move the tonneau cover when the decklid is open between a first position in which the tonneau cover panel is disposed in front of the decklid and a second position wherein the tonneau cover panel is disposed below the decklid.

According to another feature of the invention, at least one hydraulic cylinder is connected by brackets to at least one of the side linkages and the decklid. Two hydraulic cylinders are preferably provided, with one hydraulic cylinder being provided for each of the two side links. Each hydraulic cylinder is mounted on a bracket to be linearly movable relative to the decklid whereby movement of the drive cylinder causes the arcuately movable ends of the front and rear control links to move between the first and second positions. Right and left side linkages are provided at transversely spaced locations on the decklid and tonneau. The bracket that mounts the cylinder on the decklid is slidable relative to the decklid to provide a "lost motion" type of connection when the cylinder is actuated. This lost motion connection is used to unlatch the latches provided at either end of the cylinder rod.

These and other features and aspects of the invention will be better understood in view of the attached drawings and in light of the following detailed description of the best mode for practicing the invention.

BEST MODE FOR CARRYING OUT THE INVENTION

Figures 1, 2:
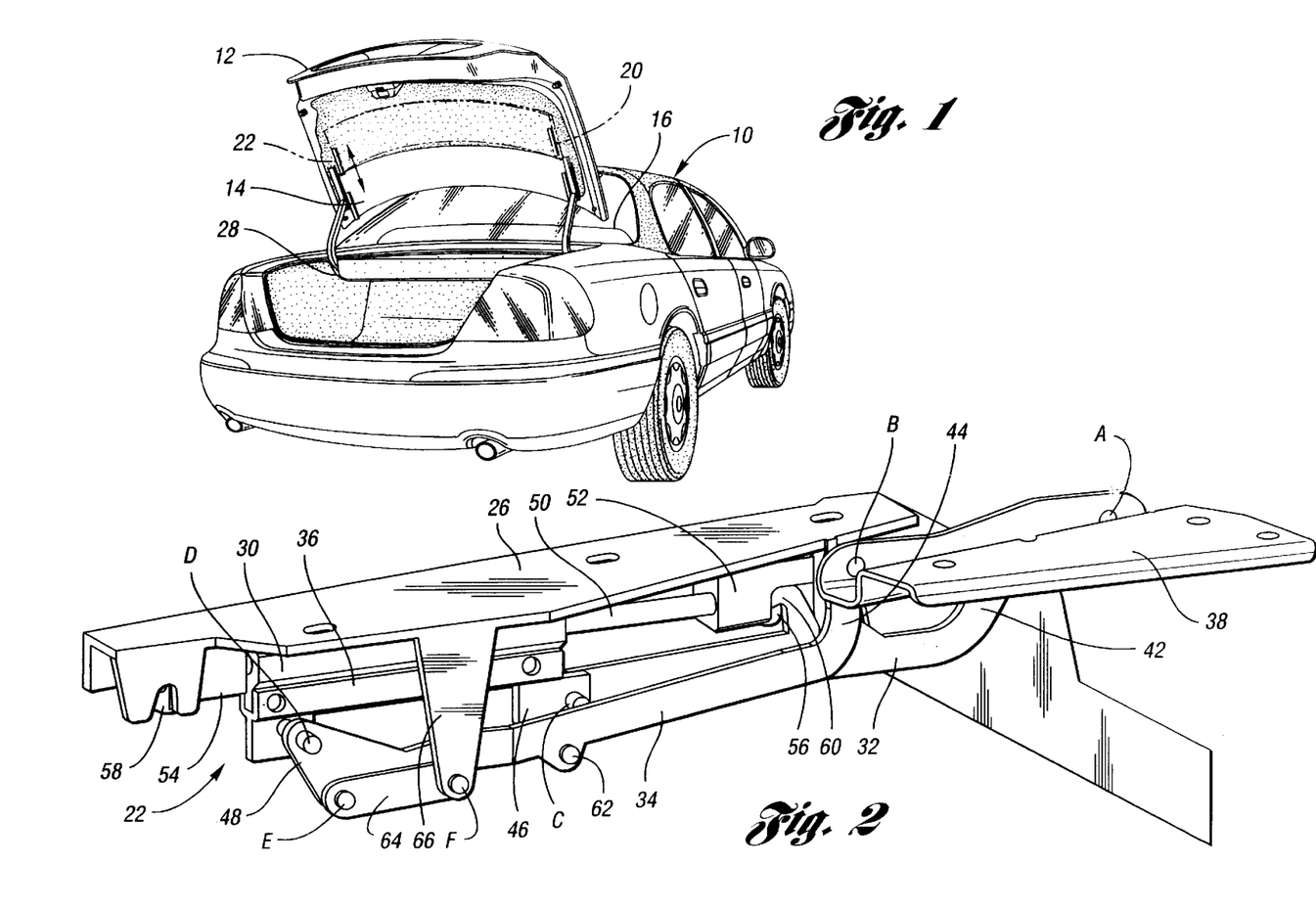
FIG. 1 is a rear perspective view of a vehicle having a decklid and tonneau cover connected by a linkage and drive system in accordance with the present invention.
FIGS. 2–6 are a series of perspective views showing the linkage and drive system at five different points in the cycle showing the tonneau cover cycling from its forward position covering the convertible top storage well to a tonneau cover stowed position wherein the tonneau cover panel is disposed below the decklid.

Referring now to FIG. 1, a vehicle 10 having a decklid 12 and a tonneau cover 14 is illustrated. The tonneau cover 14 is located behind a rear seat 16 of the vehicle 10. A linkage system including a right side linkage 20 and a left side linkage 22 connects the tonneau cover 14 to the decklid 12. The linkages are secured by a decklid bracket 26, shown in FIGS. 2–6, to the bottom side of the decklid 12. The tonneau cover 14 as shown in FIG. 1 is shown on the decklid 12 with the decklid 12 open. When the decklid 12 is closed, the tonneau cover 14 is disposed over a storage well 28 in which a convertible top or retractable hardtop of the vehicle 10 may be stored.

For brevity, only the left side linkage 22 is described below to explain the structure and function of the linkage system. It is to be understood that the right side linkage 20 is a mirror image of the left side linkage 22.

Referring now to FIGS. 2–6 the components of the left side linkage 22 will be described in conjunction with a hydraulic cylinder 30 that is used to operate the linkage 22. The linkage 22 and hydraulic cylinder 30 cause the tonneau cover 14 to move when the decklid is open. The tonneau cover 14 has a first position for covering the storage well 28 when the decklid is closed. The tonneau cover 14 may be moved to a second position suspended below the decklid 12 after the decklid is opened. A front control link 32 and a rear control link 34 are connected to a cylinder bracket 36 and a tonneau mounting bracket 38. The cylinder bracket 36 is secured to the hydraulic cylinder 30. The front control link 32 and rear control link 34 have arcuately movable ends 42, 44, respectively. The arcuately movable ends 42, 44 are pivotably connected to the tonneau mounting bracket 38. The arcuately movable end 42 of the front control link 32 is connected to a forward portion of the tonneau cover 14 by the tonneau mounting bracket 38. The arcuately movable end 44 of the rear control link 34 is connected to the tonneau cover 14 by the tonneau mounting bracket 38 at a location rearwardly spaced from the arcuately movable end 42 of the front control link 32. An intermediate pivoting end 46 of the front control link 32 and an intermediate pivoting end 48 of the rear control link 34 are pivotably connected to the cylinder bracket 36.

The hydraulic cylinder 30 includes a cylinder rod 50 that is secured on its forward end to forward cylinder anchor 52 and on its back end to a rearward cylinder anchor 54. The hydraulic cylinder 30 is a double acting hydraulic cylinder that is movable on the cylinder rod 50 in fore and aft directions. Hydraulic fluid is supplied to internal chambers (not shown) of the hydraulic cylinder 30 to cause a piston within the hydraulic cylinder to drive the hydraulic cylinder 30 fore and aft on the cylinder rod 50.

Figure 7:
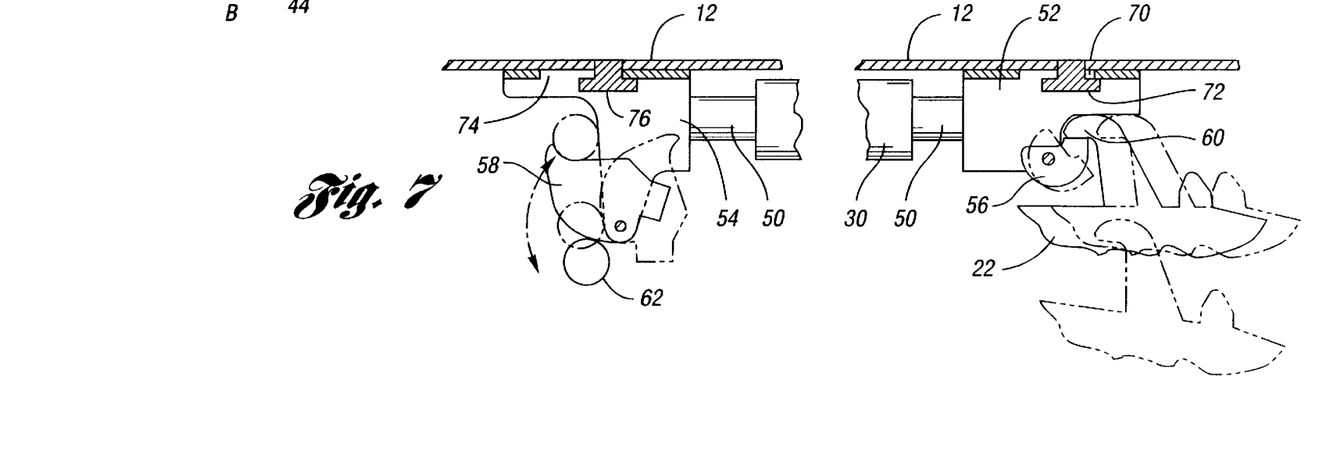
FIG. 7 is a schematic view showing the latch mechanisms on the hydraulic cylinder bracket.

As shown in FIG. 7, the forward cylinder anchor 52 and rearward cylinder anchor 54 are secured to the decklid 12 by a sliding mount that will be described in greater detail below.

Referring now to FIGS. 2–6, a tonneau extended latch 56 is provided on the forward cylinder anchor 52 that locks the tonneau cover 14 in its extended position, or first position, over the storage well 28. Tonneau stowed latch 58 is provided on the rearward cylinder anchor 54 to lock the tonneau cover in its second position wherein the tonneau cover 14 is suspended below the decklid 12. A catch 60 is provided on the front control link 32. Catch 60 engages the forward cylinder anchor 52 and selectively locks the front control link 32 to the forward cylinder anchor 52. A lock pin 62 is provided on the rear control link 34 and is engaged by tonneau stowed latch 58 when the tonneau cover 14 is in its second, or rear stowed, position. The catch 60 may be a hook shaped member as shown or a pin. The lock pin 62 may be a catch similar to lock pin 62, if desired, and the pin 62 or catch 60 may be generally referred to as a striker.

Idler link 64 is connected on one end to a flange 66. Flange 66 extends downwardly from the bottom 26 of the decklid bracket 26. The other end of the idler link 64 is connected to the rear control link near the intermediate pivoting end 48 of the rear control link 34. The intermediate pivoting end 48 of the rear control link 34 has a modified bell crank shape. Idler link 64 rotates as the hydraulic cylinder 30 reciprocates on the cylinder rod 50. Rotation of the idler link 64 is only a partial rotation that causes the rear control link 34 to move in an accurate path. Alternatively, the idler link could be designed to act upon the front control link 32.

Front control link 32 is connected to the tonneau bracket 38 on the tonneau cover 14 by pivot A. Rear control link 34 is connected to the tonneau bracket 38 at pivot B. Intermediate pivoting end 46 of the front control link is connected to cylinder bracket 36 at pivot C. Rear control link 34 is connected to the cylinder bracket 36 on its intermediate pivoting end 48 by means of pivot D. Idler link 64 is connected at pivot E to the intermediate pivoting end 48 of the rear control link 34. The other end of the idler link 64 is connected at pivot F to the flange 66. Pivots A–F are pivot pins, rivets, or other fasteners that rotatably secure the parts together as described above.

Referring now to FIG. 7, the sliding mount of forward cylinder anchor 52 and rearward cylinder anchor 54 is described in greater detail. Forward cylinder anchor 52 has a slot 70 in which a headed pin 72 is received. Headed pin 72 is attached to the decklid 12. The tonneau extended latch 56 is contacted by the catch 60 that continues upwardly moving the latch 56 toward the cylinder 30. As the catch 60 moves past the catch 56, it moves away from the hydraulic cylinder 30 to lock the catch 60 in place. When the cylinder 30 reverses to begin moving the tonneau cover 14 to the stowed position, the forward cylinder anchor 52 moves rearward initially with the anchor 52 sliding on the headed pin 72 the length of the slot 70 until the catch 60 clears the latch 56. At this point, the cylinder 30 drives the linkage 22 in an arcuate path toward the stowed position as previously described.

When the tonneau cover 14 is moved to the stowed position, the rearward cylinder anchor 54 engages the lock pin 62. Rearward cylinder anchor 54 has a slot 74 in which headed pin 76 is received. Headed pin 76 is attached to the decklid 12. Tonneau stowed latch 58 is contacted by lock pin 62 that continues upwardly moving the latch 58 toward the cylinder 30. As the pin 62 moves past the latch 58, the latch 58 moves away from the cylinder 30 to lock the pin 62 in place. When it is desired to move the tonneau cover 14 to the extended position, the cylinder 30 again reverses moving the rearward cylinder anchor 54 forward initially with the rearward cylinder anchor 54 sliding on the headed pin 76 the length of the slot 74 until the pin 62 clears the latch 58. The cylinder 30 may then drive the linkage 22 in an arcuate path toward the extended position.

Figure 3:
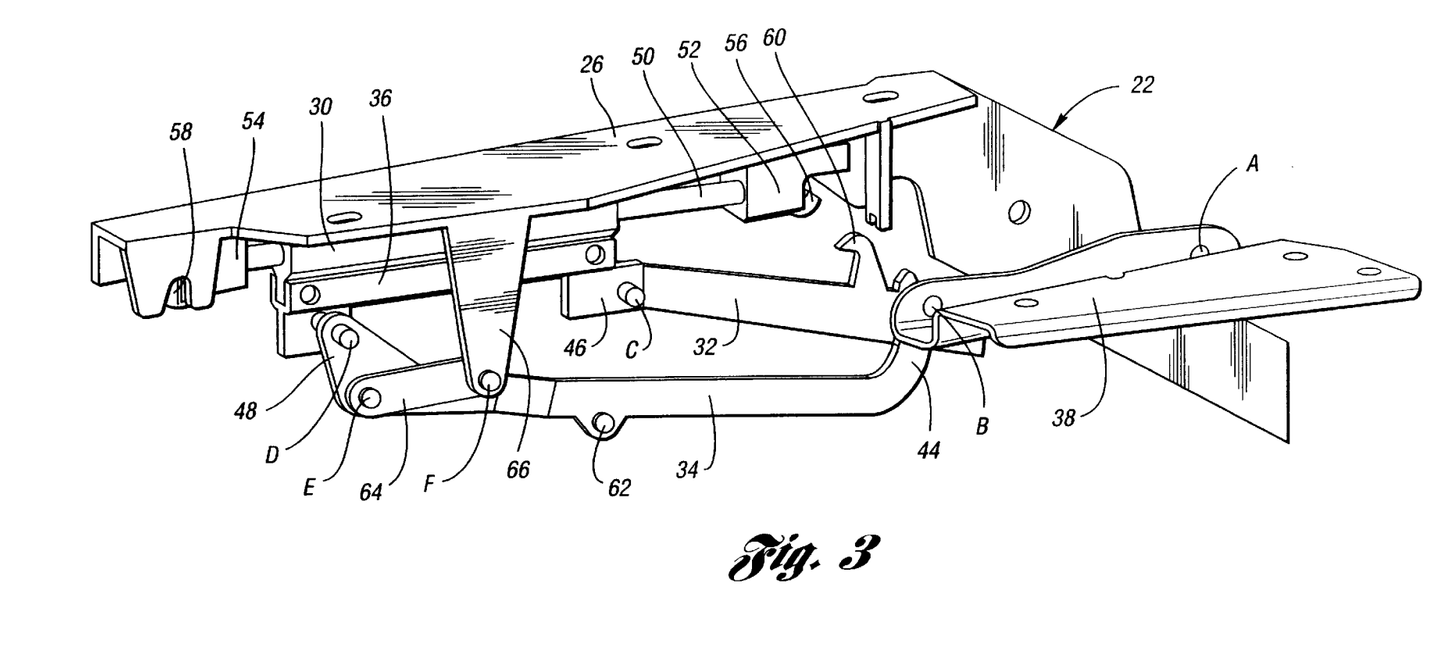
Figure 4:
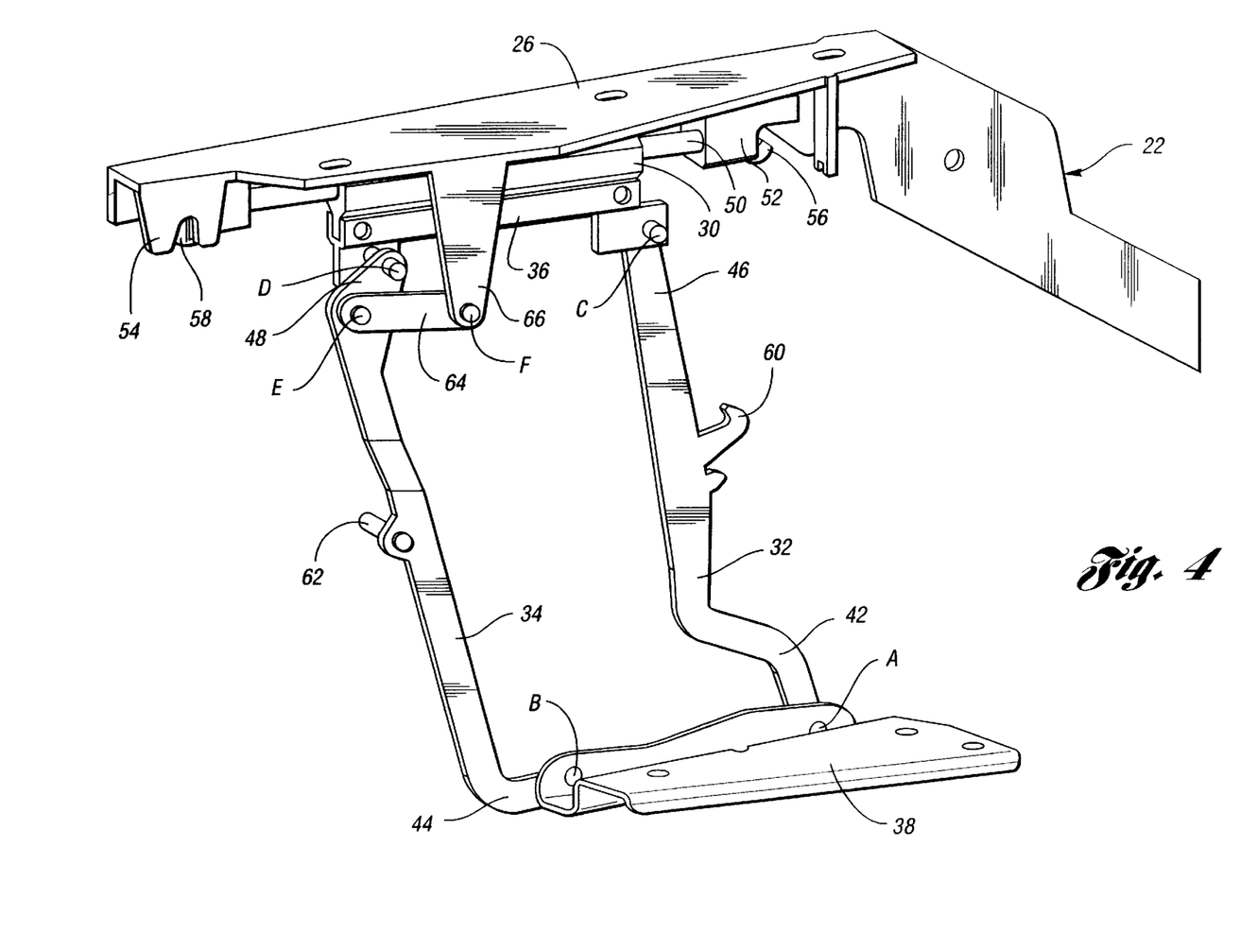
Figure 5:
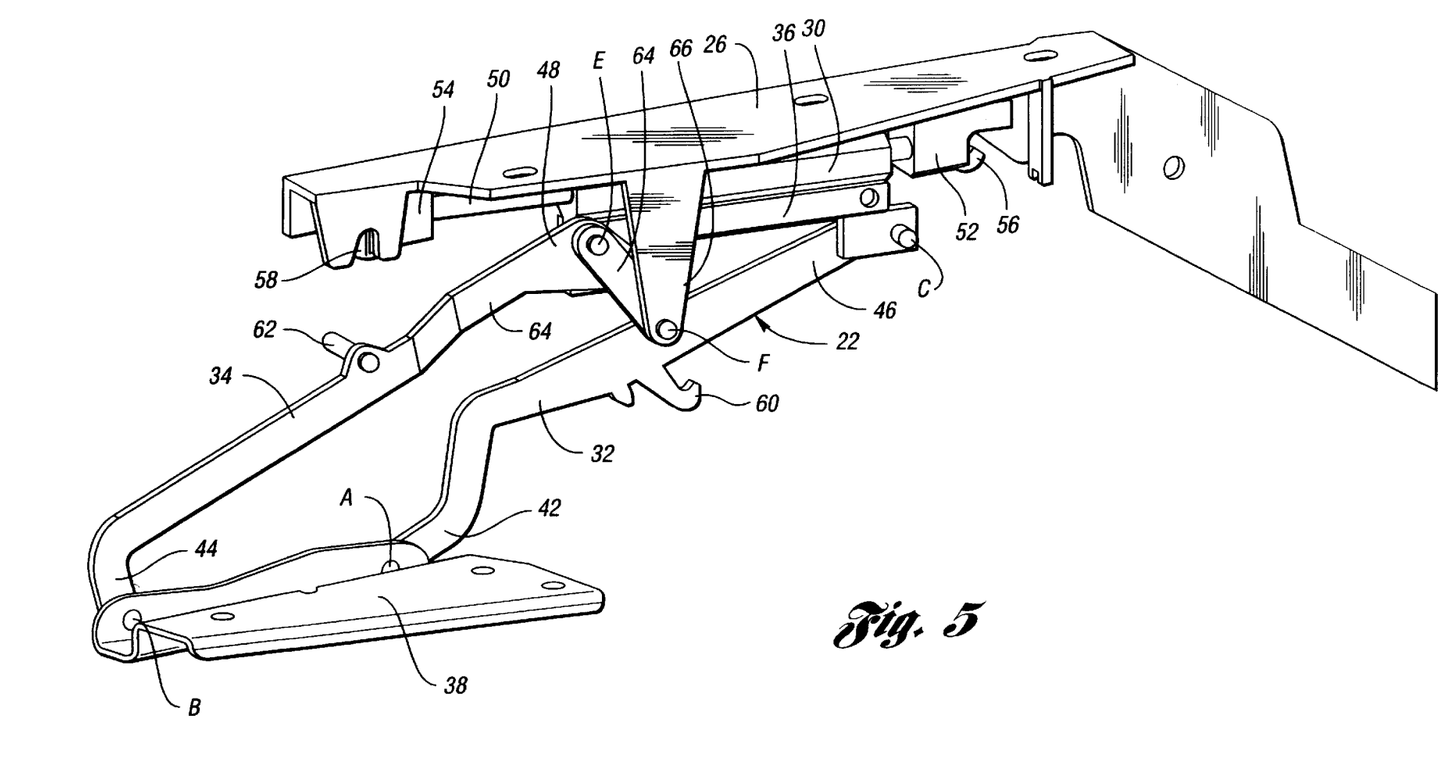
Figure 6:
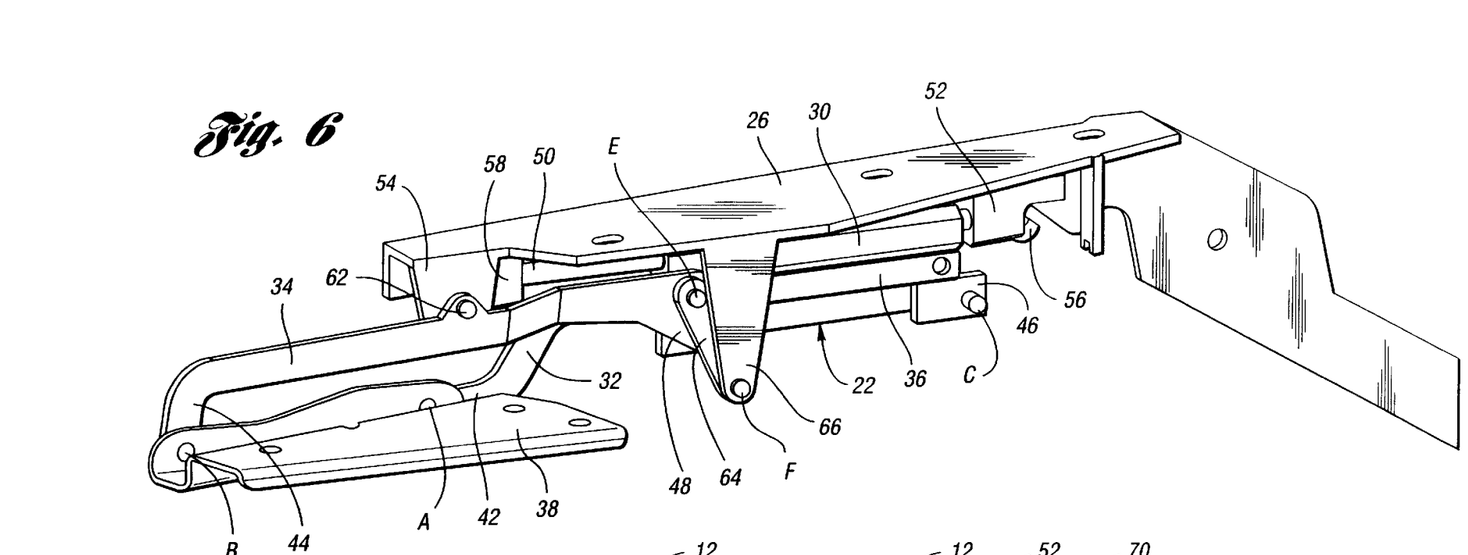

With continued reference to FIGS. 2–6, operation of the system will be described beginning with the tonneau cover 14 in the forward position as shown in FIG. 2. The catch 60 of the front control link 32 is locked by the tonneau extended latch 56. When the system is operated, the first action is that the cylinder rod 50 moves the anchor 52 in opposite relative direction to unlatch the catch 60 from the latch 56. After the rod has moved rearwardly approximately 8 millimeters to allow the tonneau extended latch 56 to unlatch the catch 60, the hydraulic cylinder 30 moves forward. Referring specifically to FIGS. 2 and 3, the hydraulic cylinder 30 moves forward causing the tonneau cover 14 to move rearwardly and downwardly in a arcuate path. The idler link 64 rotates in response to movement of the hydraulic cylinder 30 about pivot point F on the flange 66. The other end of the idler link pulls the rear control link 34 downwardly. This movement continues as shown in FIGS. 4–6 until the hydraulic cylinder completes its travel as shown in FIG. 6. The tonneau cover 14 completes an arc of approximately 180° during the course of its travel as illustrated in FIGS. 2–6. When the tonneau cover is in the position shown in FIG. 6, the tonneau stowed latch 58 engages the lock pin 62 to hold the tonneau cover 14 in its second position, suspended below the decklid bracket 26.

When the tonneau cover 14 is moved from its stowed position, to its extended position or its second position to first position, the steps are repeated with the motions reversed.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In combination, a tonneau cover for covering a roof storage compartment of a vehicle having a retractable roof and a decklid for closing a trunk of the vehicle in a closed position and providing access to the trunk in an open position, the combination comprising:
    the decklid connected by at least one hinge to the vehicle;
    the tonneau cover moveably attached to the decklid;
    a linkage connecting the tonneau cover to the decklid, the linkage being provided for moving the tonneau cover when the decklid is in the open position between a first position wherein the tonneau cover is disposed in front of the decklid and a second position wherein the tonneau cover is disposed adjacent the bottom side of the decklid;
    a drive system operatively connected to the linkage for moving the linkage between the first position and the second position; and
    the tonneau cover being shifted to a position above the roof storage compartment by closing the decklid when the tonneau cover is in the first position, the tonneau cover being shifted to the second position when the decklid is in the open position to provide clearance for the retractable roof.

2. The combination of claim 1 wherein the linkage includes a decklid bracket attached to the decklid, a tonneau cover bracket attached to the tonneau cover, a front control link connecting a front portion of the tonneau cover bracket to a forward location on the decklid bracket and a rear control link connecting a rear portion of the tonneau cover bracket to a rearward location on the decklid bracket.

3. The combination of claim 2 wherein the linkage further comprises an idler link connected to the decklid bracket and the rear control link.

4. The combination of claim 1 wherein the drive system is a hydraulic cylinder movably mounted to the decklid on a rod that is secured to a decklid bracket that is slidable relative to the decklid, the cylinder being connected on a front end to a front control link that is connected to the front of the tonneau cover and the cylinder being connected on a back end to a rear control link that is connected to the rear of the tonneau cover.

5. The combination of claim 1 wherein two linkages are provided at transversely spaced locations on the decklid and the tonneau, and wherein one drive system is provided for each linkage.

6. The combination of claim 1 wherein the linkage further comprises a latch attached to the decklid and a catch on the linkage, the latch and catch being coupled together when the tonneau cover is in the first position.

7. The combination of claim 6 wherein the linkage further comprises a second latch attached to the decklid and a pin secured to the linkage, the second latch and pin being coupled together when the tonneau cover is in the second position.

8. The combination of claim 1 wherein the linkage further comprises a latch attached to the decklid and a pin secured to the linkage, the latch and pin being coupled together when the tonneau cover is in the second position.

9. The combination of claim 1 wherein a tonneau cover mounting bracket connects the linkage to the tonneau cover.

10. The combination of claim 1 wherein a bracket is fixedly secured to the drive system and pivotally secured to the linkage at two locations.

11. In continuation, a assembly for a vehicle having a retractable roof and a roof storage well, the roof storage well being disposed behind the rear most seats in the vehicle, the vehicle having a decklid, the tonneau cover assembly comprising:
    a tonneau cover panel;
    a linkage system connecting the tonneau cover to the decklid, the linkage system having a right side linkage and a left side linkage, each of the right and left side linkages having a front control link and a rear control link, each of the front and rear control links having an intermediate pivoting end and an arcuately moving end, the arcuately moving end being connected to the tonneau panel;
    a drive system operatively connected between the linkage system and the decklid to move the tonneau cover panel between a first position wherein the tonneau cover panel is disposed in front of the decklid and a second position wherein the tonneau cover panel is disposed adjacent the bottom of the decklid.

12. The combination of claim 11 wherein the drive system further comprises at least one hydraulic cylinder connected to at least one of the side linkages and being connected to the decklid to be linearly movable relative to the decklid, whereby movement of the drive cylinder causes the arcuately movable ends of the front and rear control links to move between the first and second positions.

13. The combination of claim 11 wherein the right and left side linkages are provided at transversely spaced locations on the decklid and the tonneau cover, two drive systems are provided, with one drive system being provided for each linkage.

14. The combination of claim 11 wherein the linkage further comprises a latch attached to the decklid and a catch associated with the linkage, the latch and catch being coupled together when the tonneau cover is in the first position.

15. The combination of claim 14 wherein the linkage further comprises a second latch attached to the decklid and a pin associated with the linkage, the second latch and pin being coupled together when the tonneau cover is in the second position.

16. The combination of claim 11 wherein the linkage further comprises a latch attached to the decklid and a pin associated with the linkage, the latch and pin being coupled together when the tonneau cover is in the second position.

17. The combination of claim 11 wherein a tonneau cover mounting bracket connects the linkage to the tonneau cover.

18. The combination of claim 11 wherein a bracket is fixedly secured to the drive system and pivotally secured to the linkage at two locations.

* * * * *

UNITED STATES PATENT AND TRADEMARK OFFICE
CERTIFICATE OF CORRECTION

PATENT NO. : 6,254,165 B1
DATED : July 3, 2001
INVENTOR(S) : Frank G. Neubrand

Page 1 of 1

It is certified that error appears in the above-identified patent and that said Letters Patent is hereby corrected as shown below:

<u>Column 6, claim 11,</u>
Line 29, delete "continuation, a assembly" and insert -- combination, a tonneau cover assembly --.

Signed and Sealed this

Nineteenth Day of March, 2002

Attest:

Attesting Officer

JAMES E. ROGAN
Director of the United States Patent and Trademark Office